3,513,206
SYNTHESIS OF α-HYDROHEPTAFLUORO-
STYRENE AND IMPROVED SYNTHESIS
OF OCTAFLUOROSTYRENE
Leo A. Wall, Washington, D.C., and Joseph M. Antonucci, Silver Spring, Md., assignors to the United States of America as represented by the Secretary of the Navy
No Drawing. Filed Aug. 12, 1963, Ser. No. 301,681
The portion of the term of the patent subsequent to Aug. 9, 1983, has been disclaimed
Int. Cl. C07c 29/00, 31/14, 31/34
U.S. Cl. 260—618                    5 Claims The invention described herein may be manufactured and used by or for the Government of the United States of America for governmental purposes without the payment of any royalties thereon or therefor.

This invention relates to the synthesis of α-hydroheptafluorostyrene and to the improved synthesis of octafluorostyrene (perfluorostyrene).

This application is related to our copending application Ser. No. 167,195, filed Jan. 18, 1962, now Pat. 3,265,746, granted Aug. 9, 1966. The importance, as a thermally-stable and radiation-resistant material, of the polymer of perfluorostyrene, variously named as poly (octafluorostyrene) and polyperfluorostyrene, has stimulated the invention of the improved methods herein described for the preparation of the monomer. The invention also comprehends the production of related compounds which are useful either as monomers to form thermally-stable, radiation resistant polymers or as precursors for monomers to form such polymers.

An object, therefore, of the present invention is the preparation of perfluorostyrene.

Another object of the invention is the preparation of α-hydroheptafluorostyrene.

Still another object of the invention is the preparation of intermediates for the production of perfluorostyrene and α-hydroheptafluorostyrene.

A further object of the invention is a general method for the synthesis of highly fluorinated substituted ethylenic monomers.

Other objects and many of the attendant advantages of this invention will be readily appreciated as the same becomes better understood by reference to the following detailed description.

In this application "highly fluorinated" means that at least many of the positions in composition which can be occupied by fluorine are so occupied and the term includes the case of total fluorination. That is "highly fluorinated" includes both total and subtotal fluorination.

Perfluorostyrene has been synthesized according to methods described in the aforementioned related application and in the publication (3) of Tatlow and co-workers. According to the present invention, new methods are presented not only for the preparation of perfluorostyrene but of another highly fluorinated styrene, namely (2-2,-difluorovinyl)perfluorobenzene (α - hydroheptafluorostyrene). The various synthetic schemes employed for the synthesis of these two monomers are shown in Tables 1 and 2.

In Method A, addition of trifluoroacetaldehyde to the pentafluorophenyl Grignard reagent, prepared from bromopentafluorobenzene, (4, 5) gave, after hydrolysis, a readily sublimable, white crystalline solid, which was characterized as the new compound, 2,3,4,5,6-pentafluoro-α-(trifluoromethyl)benzyl alcohol (I). This alcohol is readily purified by sublimation under autogenous pressure using very moderate heating. The yield of purified alcohol was 53% based on the quantity of bromopentafluorobenzene used. Subsequent treatment of (I) with excess sulfur tetrafluoride (6) using n-pentane as a diluent gave a smooth conversion in 90% yield to the previously unknown (1,2,2,2-tetrafluoroethyl)perfluorobenzene (II), B.P. 116–118° C.

The final step in this synthesis, dehydrofluorination of (II), proved to be quite difficult. Chemical dehydrofluorination did not appear too promising. Dropping compound (II) into molten potassium hydroxide gave either no reaction or a dark tarry mass, depending on the contact time (cf. Method B'). The use of hot aqueous or alcoholic bases was avoided, since nucleophilic displacement of the aromatic fluorine atoms and/or solvolysis of the trifluoromethyl group might occur.

In view of the difficulty of chemical dehydrofluorination, thermal dehydrofluorination was undertaken. The pyrolysis of (II) under various temperatures and pressures was explored in order to determine the optimum conditions for the formation of perfluorostyrene. Most of the pyrolyses were conducted in iron tubes free of inert packing. In one case, an iron tube packed with steel gauze was employed. A few pyrolyses were conducted in Vycor tubes packed with glass helices. The various pyrolyzates, after distillation, were examined by vapor-phase chromatography, infrared spectroscopy, and mass spectroscopy. Vapor-phase chromatographic analysis revealed that, in all cases, the principal component of the pyrolyzate was unchanged (II). The conversion to products, as determined by vapor-phase chromatography, was low (10 to 25%). However, in most cases, the material recovery was excellent.

Under relatively mild conditions of pyrolysis (400–500° C.) under nitrogen at one atmosphere, the conversion was quite low (about 10%). However, apparently only a single product was formed. Infrared spectral analysis of the distilled pyrolyzate revealed a band at 1740 cm.$^{-1}$ which indicated the presence of a fluorinated vinyl group in the product.

Under more severe conditions of pyrolysis (500–600° C. at 760 mm., 600–850° C. at 0.2 to 5 mm.), the conversion was increased to about 15 to 25%, but now two products were formed. One of the products was formed in very high yield (90–95%) and the other in very low yield (5–10%). The product present in greater amount was shown to be identical with the product formed under mild conditions. Infrared spectral analysis of the pyrolyzate revealed a strong band at about 1740 cm.$^{-1}$ and a weak band at about 1780 cm.$^{-1}$, indicative of the presence of fluoro-olefinic groups. Isolation of the individual components of the pyrolyzates by preparative vapor-phase chromatography was rendered difficult by the closeness of their retention times and the rather small quantity of one of the products. However, the products were isolated free of the starting compound by this means. Mass-spectrometric analysis of a sample of the products indicated the presence of a small amount of a substance having a parent mass peak at 248, corresponding to $C_8F_8$, and a larger quantity of material having a parent mass peak at 230, corresponding to $C_8HF_7$.

The major product was (2,2-difluorovinyl)perfluorobenzene (IV) and the minor product was perfluorostyrene (III). The infrared bands at 1740 cm.$^{-1}$ and 1780 cm.$^{-1}$ are then attributable to —CH=CF$_2$ and —CF=CF$_2$ groups, respectively.

Under still more severe conditions (850–950° C., 760 mm. to 0.1 mm.), other products, in addition to the two styrenes, began to appear, probably as a result of secondary reactions and thermal fragmentation of the (1,2,2,2-tetrafluoroethyl)perfluorobenzene (II).

From these experiments, it was concluded that the pyrolysis of (II) in an iron tube results in more defluorination than dehydrofluorination. It has been observed in certain other cases that defluorination may predominate over dehydrofluorination. For example, the pyrolysis of 4 - hydrononafluorocyclohexene was reported by Tatlow and co-workers to yield mainly pentafluorobenzene, although some hexafluorobenzene is also produced (7).

Since defluorination appeared to occur more readily than dehydrofluorination, it was thought that bromination of (II) and subsequent pyrolysis of the bromo derivative would provide a good route to perfluorostyrene (Method A'). As expected, the bromination of (II) required high temperatures, and the method of Simons et al. (8) had to be employed. This procedure involves passing bromine and the fluorocarbon through a Pyrex or Vycor tube packed with glass helices or the like and heated to a temperature of 500 to 550° C. The yield of the (1-bromo-1,2,2,2-tetrafluoroethyl)perfluorobenzene (V) was 73%, based on the amount of (II) consumed. Only about 10% of (II) was recovered unchanged. Compound (V) was allowed to vaporize through an iron tube packed with steel gauze heated between 600 and 650° C. at 0.1 mm. pressure. A high conversion to a clear, colorless liquid was obtained. Vapor-phase chromatographic analysis of the pyrolyzate indicated that it was essentially one component. The retention time of this component was identical with that of the perfluorostyrene prepared by the dehydrohalogenation techniques (Methods A, B, and B'). Moreover, a sample purified by preparative vapor-phase chromatography gave the same infrared pattern and mass spectrogram found for the perfluorostyrene prepared by the other methods. The yield of perfluorostyrene from (V) was 95%.

ALTERNATE ROUTE TO PERFLUOROSTYRENE

Another route to perfluorostyrene and (2,2-difluorovinyl)perfluorobenzene is illustrated by Method B (Table 2). Addition of chlorodifluoroacetaldehyde, prepared by the reduction of the lithium salt of chlorodifluoroacetic acid with lithium aluminum hydride, to the pentafluorophenyl Grignard reagent resulted in a 78% yield of the previously unknown compound 2,3,4,5,6-pentafluoro-α-(chlorodifluoromethyl)benzyl alcohol (VI). Alcohol (VI) was similar in properties to alcohol (I) and was easily purified by sublimation under autogenous pressure using moderate heating. Conversion of (VI) to (2-chloro-1,2,2-trifluoroethyl)perfluorobenzene (VII) by means of sulfur tetrafluoride proceeded smoothly and in high yield (90%).

A study of the pyrolysis of (VII) in the temperature range 400 to 700° C. under several pressures was undertaken. As before, most of the pyrolyses were conducted in iron tubes free of inert packing, although a few were performed in Pyrex or Vycor tubes packed with glass helices. Examination of the various pyrolyzates by vapor chromatography, infrared spectroscopy, and mass spectroscopy revealed that, under most conditions, two products were formed and that there were identical to those obtained in the pyrolysis of (1,2,2,2-tetrafluoroethyl)perfluorobenzene (II). As expected, the conversion to products was considerably higher (30–75%) for (VII) than for (II). The major product, however, was still (IV) (25–50% of pyrolyzate), although somewhat better conversions to perfluorostyrene (5–25% of pyrolyzate) are obtained in this pyrolysis than in that of (II) under comparable conditions.

Furthermore, separation of the two monomers (from each other and from the starting compound) by preparative vapor-phase chromatography is facilitated in this pyrolysis because of the greater concentration of monomers in the pyrolyzate and the large retention-time difference between the products and the higher boiling (VII). In one pyrolysis using a glass tube packed with glass helices, heated to 600° C., a good conversion (40–45%) to perfluorostyrene was obtained. About 15 to 20% of (IV) was also formed. This pyrolysis was repeated using (1,2,2,2 - tetrafluoroethyl)perfluorobenzene (II) but now (IV) was the major product. Pyrolysis can also be accomplished by contacting the product with carbon, e.g. by the use of a carbon tube or carbon packing in other vessels.

From the above results, it appears that dechlorofluorination occurs more readily than dehydrochlorination when the pyrolysis of (2-chloro-1,2,2-trifluoroethyl)perfluorobenzene is conducted in an unpacked iron tube. In general, this study seems to indicate that, in the pyrolysis in an iron tube of (2-halo-1,2,2-trifluoroethyl)perfluorobenzenes, dehalogenation predominates over dehydrohalogenation.

THIRD ROUTE TO PERFLUOROSTYRENE

Still another synthetic route (Method B') to perfluorostyrene involves the chemical dehydrochlorination of (2-chloro - 1,2,2 - trifluoroethyl)perfluorobenzene (VII). Compound (VII) was dropped into molten potassium hydroxide and rapidly distilled out in order to provide only a short contact time. A 46% conversion to perfluorostyrene was obtained. A small quantity of unidentified, voatile compounds was also produced, along with a small quantity of tarry material. The yield of perfluorostyrene was 71% based on unrecovered starting material. An alternative technique involves passage of (VII), under reduced pressure, through a heated iron tube packed with carbon pellets which have been impregnated with potassium hydroxide. The conversion was 40 to 60%, depending on the pressure employed, and the yields ranged from 70 to 80%.

TABLE 1.—MONOMER SYNTHESIS

Method A

1. $C_6F_5MgBr \xrightarrow[\text{2) }H_2O, H^+]{\text{1) }CF_3CHO} C_6F_5\overset{\overset{OH}{|}}{C}HCF_3$
(I) 53%

2. $C_6F_5\overset{\overset{OH}{|}}{C}HCF_3 \xrightarrow[\text{n-Pentane}]{SF_4} C_6F_5CHFCF_3$
(I) → (II) 90%

$C_6F_5CHFCF_3 \xrightarrow[\text{0.1 mm-760 mm}]{500°C\text{-}900°C} C_6F_5CF{=}CF_2 + C_6F_5CH{=}CF_2$
(II) → (III) Minor product, (IV) Major product Method A'

1. $C_6F_5CHFCF_3 \xrightarrow[\text{Glass}]{Br_2, 500°C\text{-}550°C} C_6F_5CBrFCF_3$
(II) → (V) 73%

2. $C_6F_5CBrFCF_3 \xrightarrow[\text{Steel wool}]{600°C\text{-}650°C,\ 0.1\ mm} C_6F_5CF{=}CF_2$
(V) → (III) 95%

TABLE 2.—MONOMER SYNTHESIS

Method B

1. $ClF_2CCOOH \xrightarrow[\text{2) LiAlH}_4]{\text{1) LiH}} ClF_2CCH(OH)_2 \xrightarrow[P_2O_5]{H_2SO_4} ClF_2CCHO$ 2. $C_6F_5MgBr \xrightarrow[\text{2) H}_2O, H^+]{\text{1) ClF}_2CCHO} C_6F_5\underset{\underset{\text{(VI)}}{|}}{\overset{\overset{OH}{|}}{C}}HCClF_2$
   (VI) 78%

3. $C_6F_5\underset{\underset{\text{(VI)}}{|}}{\overset{\overset{OH}{|}}{C}}HCClF_2 \xrightarrow[\text{n-Pentane}]{SF_4} C_6F_5CHFCClF_2$
   (VII) 90%

4. $C_6F_5CHFCClF_2 \xrightarrow[\text{0.1 mm-760-mm}]{450°C-650°C} \underset{\text{Minor product}}{C_6F_5CF=CF_2} + \underset{\text{Major product}}{C_6F_5CH=CF_2}$
   (III)              (IV)

Method B'

1. $C_6F_5CHFCClF_2 \xrightarrow[\text{or KOH on carbon pellets}]{\text{Molten KOH}} C_6F_5CF=CF_2$
   (VII)                                                            (III)
   40–30% Conversion
   70–80% Yield TABLE 3.—GENERAL SCHEME FOR SYNTHESIS OF HIGHLY FLUORINATED SUBSTITUTED ETHYLENIC MONOMERS 1. $RM \xrightarrow[\text{2) H}_2O, H^+]{\text{1) R}_1\overset{\overset{O}{\|}}{C}-CR_2R_3X} R-\underset{R_1}{\overset{\overset{OH}{|}}{C}}-CR_2R_3X$ 2. $R-\underset{R_1}{\overset{\overset{OH}{|}}{C}}-CR_2R_3X \xrightarrow{SOCl_2 \text{ or } SF_4} R-\underset{R_1}{\overset{\overset{X'}{|}}{C}}-CR_2R_3X$ 3. $R-\underset{R_1}{\overset{\overset{X'}{|}}{C}}-CR_2R_3X \xrightarrow{-X'X} R\underset{R_1}{\overset{}{C}}=CR_2R_3$ X=Br, Cl, F, I; X'=Cl, F; R₁=highly fluorinated alkyl or substituent.
M=Li, MgBr.
R₂=H, F, highly fluorinated alkyl or aryl substituent.
R₃=H, F, highly fluorinated alkyl or aryl substituent.
R=alkyl, alkenyl, aryl group.

The methods described for the synthesis of these new styrenes can be extended and modified to provide synthetic routes to many new, highly (totally or subtotally) fluorinated substituted ethylenic monomers. Table 3 indicates the general method of the invention for making such monomers.

EXPERIMENTAL.—SYNTHESIS OF PERFLUOROSTYRENE AND (α-HYDROHEPTAFLUOROSTYRENE)

Method A (1) Synthesis of 2,3,4,5,6-pentafluoro - α - (trifluoromethyl)-benzyl alcohol (I).—The Grignard reagent of bromopentafluorobenzene was prepared from 43 g. (0.17 mole) of bromopentafluorobenzene, according to the procedure developed at the National Bureau of Standards (4) and at the University of Birmingham (5). The preparation was performed in a 500-ml. three-necked flask equipped with a motor-driven, Teflon-blade stirrer, a pressure-equalized dropping funnel carrying a nitrogen inlet tube, and a low-temperature condenser fitted with a drying tube, a low-temperature trap, and a second drying tube. The condenser and the trap were cooled by means of a slurry of Dry Ice-acetone and the entire apparatus was swept out with a stream of nitrogen during the course of the reaction. After the Grignard reagent had been prepared, the flask was cooled to −78° C. and excess trifluoroacetaldehyde was added as a gas by means of a tube leading into the flask. The trifluoroacetaldehyde was prepared from 50 g. (0.43 mole) of trifluoroacetaldehyde hydrate (Columbia Organic Co., Inc.) by dehydration, using a vigorously stirred slurry of 22 g. of phosphorus pentaoxide and 83 ml. of 97% sulfuric acid heated (9) at 90° C. The aldehyde was collected in a trap cooled to −78° C., and then distilled into a second trap also cooled to −78° C. and finally into the cooled flask containing the Grignard reagent. The mixture in the flask was constantly stirred during the addition of the aldehyde and all subsequent operations. After the addition was completed, the contents of the flask were allowed to come to room temperature and then heated under reflux for one hour. The mixture was allowed to stand at room temperature overnight. After decomposition of the dark-brown complex with 5% aqueous sulfuric acid, the aqueous layer was separated from the ether layer and extracted several times with ether. The ether extracts and ether layer were combined, washed with a saturated sodium bicarbonate solution, then with a saturated sodium chloride solution, and finally dried over anhydrous sodium sulfate overnight.

After removal of the drying agent by filtration, the ether was removed by distillation using a 16-inch Vigreux column. A fraction (about 25 g.), B.P. 35–100° C., was then collected. Vapor-phase chromatographic analysis revealed that this fraction was a mixture composed mainly of ethyl ether and pentafluorobenzene, along with a lesser quantity of bromopentafluorobenzene. The pot residue (a dark-brown solid) did not lend itself too well to fractional distillation under reduced pressure because of its facile sublimation. Consequently, the solid, dark residue was sublimed under autogenous pressure using a water bath heated between 50 to 75° C. A white, crystalline solid, M.P. 65–67° C., was obtained. The low carbon analysis (see below) may be attributable to a small quantity of trifluoroacetaldehyde hydrate which apparently co-sublimes with the alcohol. Infrared spectral analysis showed a band at 3480 cm.$^{-1}$ attributable to the hydroxyl group and a strong doublet at approximately 1500 cm.$^{-1}$ which is characteristic of skeletal vibrations of the pentafluorophenyl ring. Mass spectrometry gave peaks indicative of the assigned structure of the carbinol. The yield of the purified alcohol was 27 g. (53%).

Elemental analysis gave (percent): C, 35.1; H, 0.8; F, 56.5. $C_8H_2F_8O$ requires (percent): C, 36.1; H, 0.8; F, 57.1.

(2) Synthesis of (1,2,2,2 - tetrafluoroethyl)perfluorobenzene (II).—In a 180-ml. silver-lined bomb was placed 27 g. (0.10 mole) of alcohol (I) in 90 ml. of freshly distilled n-pentane. The bomb was sealed and fitted with a needle valve. After cooling to −80° C., the bomb was evacuated to about 1 mm., filled with nitrogen and then re-evacuated. This procedure was repeated several times. About 25 g. (0.23 mole) of sulfur tetrafluoride (6) was then added to the cooled evacuated bomb. The valve was closed and the bomb was heated in a shaker with moderate heating (50–85° C.) for 12 to 15 hours. The bomb was vented in a hood through a series of traps to remove excess sulfur tetrafluoride and hydrogen fluoride. The first two traps were polypropylene suction flasks connected by stainless-steel tubing fitted with rubber stoppers. The first trap served as a back-up trap and the second was cooled to about −80° C. The last trap was a 4-liter glass suction flask containing about a liter of potassium hydroxide solution (10%). After the bomb was vented, the contents were poured into a polypropylene beaker and allowed to sit in the hood until the escape of fumes subsided. The yellow liquid was then carefully distilled through a 16-inch glass-helix packed column. After the n-pentane was removed, about 24 g. of clear colorless liquid, B.P. 116–118° C., was collected. Vapor-phase chromatography indicated that the product was highly pure (>97%). Mass spectrometry gave peaks which confirmed the assigned structure for compound (II). Infrared spectrometry revealed a weak band at 2950 cm.$^{-1}$ attributable to the >CHF structure (10) and a strong band in the region 1490–1530 cm.$^{-1}$ attributable to the pentafluorophenyl ring.

(3) *Pyrolysis of (1,2,2,2 - tetrafluoroethyl)perfluorobenzene (II).*—The usual pyrolysis apparatus consisted of an iron tube, usually unpacked, fitted with 24/40 standard-taper Monel (inner) joints at both ends. The 24-in. by ⅝-in. tube was centered in a vertical position in an electric furnace having a heated zone of about 11 inches. The lower joint of the tube was attached to three traps in series by means of a vacuum adapter fitted with a water-jacketed 24/40 standard-taper Pyrex female joint. The last trap was connected either to a vacuum pump or to a drying tube, depending on whether reduced or atmospheric pressure was employed. The traps were cooled by liquid nitrogen or Dry Ice-acetone. The upper joint of the tube was attached, by means of a second adapter fitted with a water-jacketed 24/40 standard-taper Pyrex female joint, to either a pressure-equalized dropping funnel or to a small vacuum-distillation flask. The dropping funnel arrangement was only employed for pyrolysis under nitrogen at atmospheric pressure. The temperature was measured by a thermocouple placed on the outer wall of the tube in the central portion of the heated zone. The pyrolyses conducted in glass tubes (Pyrex or Vycor tubes, 24-in. by 1-in. with 24/40 standard-taper joints at both ends) employed a similar set-up, except that the tube was packed with enough Pyrex helices to occupy the lower three-quarters of the heated zone (about 7–8 inches).

Two typical pyrolyses are described below:

(a) *Pyrolysis of (II) at 500° C. and one atmosphere pressure over steel gauze.*—Approximately 4.0 g. of compound (II) was dropped through an iron tube heated at 500° C. and packed loosely with enough clean steel wool that about three-quarters of the heated zone was filled. The rate of addition was approximately one drop per second. The entire pyrolysis was conducted under a slow nitrogen stream at one atmosphere pressure. The pale-yellow pyrolyzate (3.7 g.) was analyzed by vapor-phase chromatography, using a column 24 in. by ¼ in. filled with a packing of 30% silver nitrate-triethylene glycol on 60/80 mesh Chromosorb P. The chromatogram revealed that essentially two components were present in the pyrolyzate. The ratio of the peak areas indicated that one component formed about 85 to 90% of the mixture. This compound had the same retention time as the starting material. An infrared spectogram of the pyrolyzate revealed a band at 1740 cm.$^{-1}$ not present in the spectrum of compound (II). A change in the band at 2950 cm.$^{-1}$ also occurred. Enough of the new compound was isolated by preparative vapor-phase chromatography to permit obtaining a mass spectogram; this gave a parent mass peak at 230. The product formed on pyrolysis was compound (IV) and the infrared band at 1740 cm.$^{-1}$ is attributable to —CH=CF$_2$.

(b) *Pyrolysis of (II) at 700° C. and 4.0 mm. pressure in an unpacked iron tube.*—Approximately 3.0 g. of compound (II) was allowed to vaporize into an unpacked iron tube at 700° C. using reduced pressure (3.5–4.0 mm.). Infrared spectral analysis of the pyrolyzate revealed a strong new band at 1740 cm.$^{-1}$ and a weak band at 1780 cm.$^{-1}$. Vapor phase chromatography revealed the presence of three components. The major component (~75%) of the pyrolyzate was the starting compound (II). The major product (~20%) had the same retention time as compound (IV) above. The new product was present in the smaller quantity (~5%) and is presumably responsible for the infrared band at 1780 cm.$^{-1}$. A mass spectrogram of a mixture of the products (obtained free from starting material by preparative vapor-phase chromatography) revealed a weak mass peak at 248 and a very strong mass peak at 230. The new product is perfluorostyrene (III) and the band at 1780 cm.$^{-1}$ is attributable to —CF=CF$_2$.

A 24-in. by ¼-in. column filled with a packing of 30% silicone oil (Dow Corning 550) on 40/60 mesh acid-washed firebrick was used in the vapor-phase chromatographic analyses.

Method A'

(1) *Synthesis of (1-bromo - 1,2,2,2 - tetrafluoroethyl) perfluorobenzene (V).*—The method of Simons et al. (8) was employed to convert (II) into its bromo derivative. The reaction apparatus consisted of a Vycor tube 24-in. by 1-in. packed with Pyrex glass helices to a height of 8 inches. Since the (1,2,2,2-tetrafluoroethyl)perfluorobenzene and bromine were not very miscible, it was necessary to drop the fluorocarbon and the bromine simultaneously through the reactor. Two pressure-equalized dropping funnels were connected to the top of the tube by means of an adapter. At the lower end was placed a receiver which, in turn, was connected to two traps in series. The receiver was cooled by ice water and the traps by a slurry of Dry Ice-acetone. About 2 g. of compound (II) and 10 g. of bromine were dropped simultaneously under a stream of nitrogen through the tube heated to 550° C. The dark-red liquid which was collected in the receiver and first trap was then carefully distilled through a 4-inch glass-helix packed column to remove most of the bromine. The column was removed and the residue was rapidly distilled to give 2.3 g. of a pale-yellow liquid, B.P. 142–158° C. Vapor-phase chromatography revealed two main peaks. The minor component (about 10%) of the mixture was unreacted α-hydrononafluoroethylbenzene. The major component had a much longer retention time and was the brominated ethylbenzene. The crude bromo compound was purified by preparative vapor-phase chromatography to give 1.9 g. (73% yield) of compound (V). Mass spectrometry confirmed the structure assigned to compound (V).

(2) *Pyrolysis of (1 - bromo - 1,2,2,2-tetrafluoroethyl) perflurobenzene (V).*—Compound (V) was debromofluorinated by allowing about 1.9 g. of it to vaporize into an iron tube (18-in. by ⅝-in.) packed with steel wool or gauze throughout the heated zone (12 inches) and heated to 640° C. The reaction was carried out under reduced pressure (0.1 to 0.2 mm.). A clear, colorless liquid (1.3 g.) was collected. Vapor-phase chromatography revealed that the liquid was essentially one component. The retention time was much less than that of the starting material and corresponded to the perfluorostyrene obtained by the dehydrohalogenation techniques. Infrared spectrometry revealed strong hands at 1780 cm.$^{-1}$ and at about 1500 cm.$^{-1}$, corresponding to the —CF=CF$_2$ group and C$_6$F$_5$-group, respectively. Mass spectrometry also confirmed the assigned structure; the yield was 95%.

*Chemical analysis.*—Theory for C$_8$F$_8$ (percent): C, 38.7; F, 61.3. Found (percent): C, 38.3; F, 57.7.

Method B (1) *Synthesis of chlorodifluoroacetaldehyde.*—In a one-liter three-necked flask equipped with a motor-driven, Teflon-blade stirrer, an efficient water-cooled condenser carrying a drying tube, and a pressure-equalizer dropping funnel fitted with a nitrogen inlet tube, was placed 39 g. (0.3 mole) of chlorodifluoroacetic acid (Columbia Organic Chemicals, Inc.) in 250 ml. of anhydrous ether. The apparatus was continuously flushed with nitrogen during the course of the reaction. After the flask had been cooled to about —60° C., a suspension of 2.4 g. (0.3 mole) of lithium hydride in 150 ml. of anhydrous ether was cautiously added with stirring, over a period of 30 minutes. The temperature of the etheral mixture was raised to —10 C. and a solution of 3.8 g. (0.1 mole) of lithium aluminum hydride in 200 ml. of anhydrous ether was slowly added over a period of 30 minutes. Throughout the addition, the temperature was maintained between −10° C. and 0° C. After the addition was completed, the stirring was continued for one hour at −5° C. The reaction mixture was allowed to warm to room temperature overnight.

The flask was cooled to −10° C. and 20 ml. of water followed by 100 ml. of 15% sulfuric acid was carefully added with stirring. The ether layer was separated and the aqueous layer was extracted several times with small portions of ether. The ether layer and the ether extracts were combined and dried overnight over anhydrous sodium sulfate. The ether was removed by distillation. A small amount of liquid boiling between 35 and 90° C. was also collected. The latter fraction presumably is crude 2-chloro-2,2-difluoroethanol. The residual liquid (about 36 g.) represented the crude aldehyde hydrate. The crude yield of hydrate was about 90%. The crude aldehyde hydrate was converted to the free aldehyde by the method used to prepare trifluoroacetaldehyde (9). The over-all yield was 84% (29 g.).

(2) Synthesis of 2,3,4,5,6 - pentafluoro - α-(chlorodifluoromethyl)benzyl alcohol.—This alcohol was prepared by the same method used to prepare alcohol (I). From 24.7 g. of bromopentafluorobenzene and excess (29 g.) chlorodifluoroacetaldehyde there was obtained, via the Grignard reaction, 22 g. of a white crystalline solid, M.P. 53–55° C. The yield of the purified alcohol (VI) was 78%, based on the bromopentafluorobenzene consumed. The structure assigned to the alcohol was confirmed by infrared spectral analysis (hydroxyl band at about 3500 cm.$^{-1}$ and $C_6F_5$-doublet at 1500–1520 cm.$^{-1}$) and by mass spectrometry.

(3) Synthesis of (2 - chloro - 1,2,2-trifluoroethyl)perfluorobenzene (VII).—The same procedure used to prepare compound (II) was employed to prepare compound (VII). From 20 g. (0.071 mole) of the alcohol is 70 ml. of n-pentane and 22 g. of sulfur tetrafluoride, heated in a bomb at 59–60° C. for 18 hours, was obtained 18.5 g. of a clear colorless liquid, B.P. 155–7° C. Vapor-phase chromatography revealed that the liquid was essentially one component (>98%). The infrared spectrum resembled that of (II); mass spectrometry showed the appropriate peaks for the assigned structure.

(4) Pyrolysis of (2 - chloro - 1,2,2-trifluoroethyl)perfluorobenzene (VII).—The pyrolysis apparatus was the same as that used in the case of compound (II). The results of several pyrolyses in an unpacked iron tube were similar to those obtained in the pyrolysis of (II), except that the conversion to products was considerably higher. The major product was (IV) and the minor product proved to be perfluorostyrene (III). Under mild conditions (400–500° C. and 0.1 mm.), only (IV) was formed. Under more severe conditions (higher temperatures and/or longer contact times), perfluorostyrene was produced, along with (IV), although the latter was still the major product.

However, when the pyrolysis of (VII) was conducted at 600° C. and atmospheric pressure under nitrogen in a Pyrex glass tube packed with Pyrex helices, perfluorostyrene (III) was the major product and (IV) was the minor product. The conversion to perfluorostyrene was 40–45%. Only a 10–15% conversion to (IV) was obtained. A small, low-boiling, unidentified component (5%) was also present. The material recovery was quite good (90–95%).

The components of the various pyrolyzates obtained from compound (VII) were isolated by preparative vapor-phase chromatography using an 8-ft. by ⅝-in. column filled with a packing of 25% silicone oil (SE–30) on 40/60 mesh acid-washed Chromosorb W. Separation of the components was facilitated in this case because of (a) longer retention time of (VII) as compared to that of (II) and (b) the higher conversion to products.

The identity of the products was confirmed by infrared spectroscopy, mass spectrometry, and vapor-phase chromatography.

METHOD B′

(1) Chemical dehydrochlorination of (2-chloro-1,2,2-trifluoroethyl)perfluorobenzene (VII).—In a 25-ml. sidearm flask (equipped with a short distillation head leading to a receiver cooled to −20° C.) was placed 5 g. of potassium hydroxide and 5 g. of anhydrous sodium carbonate. The side arm was covered with a silicone-rubber septum. The flask was heated under reduced pressure (20 mm.) in order to remove most of the water from the potassium hydroxide-sodium carbonate mixture. The vacuum was released, and a drying tube was attached to the distillation head. The heating was continued until the potassium hydroxide in the mixture just began to melt. At this point, 2 g. of compound (VII) was injected in several spurts by means of a hypodermic syringe inserted through the rubber septum. Along with a small amount of volatile material that flashed over, about 1.6 g. of an acrid-smelling liquid was collected. Vapor-phase chromatographic analysis revealed essentially three components in this material. One of the major components (40%) was unchanged starting material. The other (55%) had the same retention time as perfluorostyrene. The minor component (5%) had the same retention time as (IV). Preparative vapor-phase chromatography gave about 0.8 g. of perfluorostyrene and 0.7 g. of (VII). The yield of perfluorostyrene, based on unrecovered starting material, was 71% (conversion, 46%). A small amount of unidentified, tarry substance remained in the flask.

An alternative technique for dehydrochlorination employed an iron tube 24-in. by ⅝-in. packed with carbon pellets that had been impregnated with an equal weight of potassium hydroxide. The packing occupied about 10 inches of the heated zone. The tube was heated to 400° C. and compound (VII) was slowly distilled over under reduced pressure (0.1 to 1 mm.). Conversions were of the order of 40–60%, and yields of 70–80% of perfluorostyrene were obtained.

LITERATURE REFERENCES (1) Antonucci, J. M., Straus, S., Tryon, M., and Wall L. A., "Degradation of Poly-2,3,4,5,6-pentafluorostyrene," Proc. Sym. Polymer Degradation, Soc. of Chem. Ind., Monograph No. 13, 295 (1961).

(2) Brown, D. W., Florin, R. E., and Wall, L. A., J. Research Natl. Bur. Standards, 64A, 269 (1960).

(3) Letchford, B. R., Patrick, C. R., Stacey, M., and Tatlow, J. C., Chem. Ind. (London), 32, 1472 (1962).

(4) Pummer, W. J., and Wall, L. A., J. Research Natl. Bur. Standards, 63A, 167 (1959).

(5) Nield, E., Stephens, R., and Tatlow, J. C., J. Chem. Soc., 166 (1959).

(6) Englehardt, V. A., Hasek, W. R., and Smith, W. C., J. Am. Chem. Soc., 82, 543 (1960).

(7) Coe, P. L., Patrick, C. R., and Tatlow, J. C., Tetrahedron, 9, 240 (1960).

(8) Brice, T. J., Pearlson, W. H., and Simons, J. H., U.S. Pat. 2,658,928 (1953).

(9) Braid, M., Iserson, H., and Lawlor, F. E., J. Am. Chem. Soc., 76, 4027 (1954).

(10) Nield, E., Stephens, R., and Tatlow, J. C., J. Chem. Soc., 3800 (1960).

Obviously many modifications and variations of the present invention are possible in the light of the above teachings. It is therefore to be understood that within the scope of the appended claims the invention may be practiced otherwise than as specifically described.

What is claimed is:

1. 2,3,4,5,6 - pentafluoro - α - (chlorodifluoromethyl) benzyl alcohol.

2. The method of making the alcohol of claim 1 comprising reacting chlorodifluoroacetaldehyde with the pentafluorophenyl Grignard reagent $C_6F_5MgBr$ and thereafter hydrolyzing the reaction product.

3. (2-chloro-1,2,2-trifluoroethyl) perfluorobenzene.

4. The method of making the product of claim 3 comprising reacting the alcohol of claim 1 with sulfur tetrafluoride.

5. The method of making perfluorostyrene and α-hydroheptafluorostyrene comprising pyrolyzing the product of claim 3 at a temperature in the range of about 450–650° C.

References Cited

UNITED STATES PATENTS

| | | | |
|---|---|---|---|
| 2,686,816 | 8/1954 | Stoll et al. | |
| 3,187,058 | 6/1965 | Patrick et al. | |
| 2,980,740 | 4/1961 | Hasek et al. | 260—653.8 |
| 2,658,928 | 11/1953 | Simons et al. | 260—653.8 |
| 2,733,278 | 1/1956 | Anderson | 260—653.3 |
| 2,774,798 | 12/1956 | Davis et al. | 260—653.5 |
| 3,148,223 | 9/1964 | Jacobs et al. | 260—653.5 |
| 3,265,746 | 8/1966 | Wall et al. | |

OTHER REFERENCES

Chen et al.: J. Am. Chem. Soc., vol. 72, pp. 5124–5 (1950).

Harvey et al.: Chem. Abstracts, vol. 49, pp. 1467o–71e (1955).

Hasek et al.: J. Am. Chem. Soc., vol. 82, pp. 543–51 (1960).

McBee et al.: J. Am. Chem. Soc., vol. 74, pp. 1736–7 (1952).

Morrison et al.: Organic Chemistry, 1959, pp. 33, 111–114, 312–318.

Stewart et al.: Tetrahedron Letters, 1960, pp. 28–30.

Talalaeva et al.: Chem. Abst., vol. 54, pp. 8677–8 (1960).

Cohen et al.: J. Am. Chem. Soc., vol. 71, pp. 3439–40 (1949).

Drysdale et al.: J. Am. Chem. Soc., vol. 79, pp. 319–22 (1957).

LEON ZITVER, Primary Examiner

N. P. MORGENSTERN, Assistant Examiner

U.S. Cl. X.R.

260—91.5, 601, 633, 651, 653, 653.3, 653.5